United States Patent [19]

Christoph et al.

[11] 3,966,835

[45] June 29, 1976

[54] PERMANENTLY ANTISTATIC POLYAMIDE COMPOSITIONS

[75] Inventors: Geert Christoph; Eduard Radlmann; Günther Nischk; Ludwig Bruns; Günther Schnuchel, all of Dormagen, Germany

[73] Assignee: Bayer Aktiengesellschaft, Leverkusen, Germany

[22] Filed: Dec. 22, 1972

[21] Appl. No.: 317,670

[30] Foreign Application Priority Data

Dec. 23, 1971 Germany............................ 2164307

[52] U.S. Cl............................ 260/830 P; 260/2 EP; 260/DIG. 15

[51] Int. Cl.²......................................... C08L 63/00

[58] Field of Search.... 260/2 EP, DIG. 15, DIG. 16, 260/857 PE, 857 G, 830 R, 830 P, 785

[56] References Cited

UNITED STATES PATENTS

| | | | |
|---|---|---|---|
| 3,213,053 | 10/1965 | Kendrick, Jr. | 260/DIG. 16 |
| 3,486,839 | 12/1969 | Howard | 260/830 P |
| 3,565,834 | 2/1971 | Dachs et al. | 260/830 P |
| 3,666,731 | 5/1972 | Crovatt, Jr. et al. | 260/830 P |
| 3,787,523 | 1/1974 | Crescentini et al. | 260/857 PG |

*Primary Examiner*—Murray Tillman
*Assistant Examiner*—J. Ziegler
*Attorney, Agent, or Firm*—Plumley & Tyner

[57] ABSTRACT

The invention relates to novel permanently antistatic polyamide compositions comprising an aliphatic polyamide and from 0.5 to 40 % by weight, based on the polyamide composition, of a polyalkylene oxide obtained by the copolymerisation of mono-epoxides with di- or tri-epoxides.

6 Claims, No Drawings

PERMANENTLY ANTISTATIC POLYAMIDE COMPOSITIONS

This invention relates to polyamide compositions with a permanent anti-static effect which are based on high molecular weight, linear polyamides obtained by the melt-condensation of salts of diames containing aliphatic amino groups, preferably hexamethylene diamine, with aliphatic dicarboxylic acids and/or ε-caprolactam which contain an addition of crosslinked or slightly crosslinked high molecular weight polyalkylene ethers in homogeneous distribution.

It is known that anti-static polyamide-based shaped articles such as fibres or filaments can be obtained by adding poly-(alkylene ether)-glycols either to the condensation mixture or to the molten polyamide (cf. for example, U.S. Pat. Nos. 3,329,557 and 3,374,288, German Pat. No. 1,286,683 issued Jan. 9, 1969, Belgian Pat. No. 631,199, Swiss Pat. No. 456,029). However, the polyethylene glycols used in the processes are all soluble in water, so that there is no guarantee of the material remaining in articles produced from fibres or filaments of this kind after repeated washing.

To produce anti-static fibers in accordance with Swiss Pat. No. 456,029, for example, a water-soluble poly-(alkylene ether)-glycol having a molecular weight of 10,000 is mixed with the monomeric starting materials of the polyamide before polycondensation and uniformly distributed in the resulting polymer. Most of this additive is subsequently extracted from the fibres by washing processes, in other words the anti-static effect is not permanent. In some cases, subsequent extraction of the poly-(alkylene ether)-glycols is even desirable (cf. German Pat. No. 1,286,683 issued Jan. 9, 1969) because extraction results in the production of fine cavities in the fibres which increase opacity. Furthermore the proportion of scattered light is increased by the artificially produced cavities, giving rise to a soil-hiding effect.

Various different attempts have been made to fix these additives to the polymer in order to prevent the anti-statically active constituents from being washed out of polyamide fibres and filaments or articles produced therefrom.

According to U.S. Pat. No. 3,329,557, for example, chips of polyamide-66 are coated with poly-(alkylene ether)-glycol, fused and then spun. Thereafter the poly-(alkylene ether)-glycol particles dispersed in the filament are firmly anchored in the polymer by treatment with high-energy electron beams, i.e. by crosslinking, and are thus prevented from being washed out when the filaments are treated with water. Another way of fixing the poly-(alkylene ether)-glycol particles in the polymer is to add to the polyamidepolyglycol mixture radical formers which anchor the polyglycol to the polyamide by crosslinking.

The anti-statically active constituents can also be fixed in the polyamide composition by incorporating other functional terminal groups into polyglycols. However, this method can only successfully be applied to polyglycols of relatively low molecular weight that is molecular weight approximately 700 to 3000 because the number of OH groups available for a reaction is too small in the case of high molecular weight polyglycols and because the reaction of the OH groups in that case is only statistical. The following are examples of reactions of this kind which enable the OH groups to be exchanged for other terminal groups:

1. The addition of acrylonitrile to the OH-groups of the polyglycol followed by hydrogenation to form the polyether diamine which is subsequently incorporated into a polyamide by reaction with dicarboxylic acids.
2. The addition of acrylonitrile to the OH groups of the polyglycol followed by hydrolysis of the nitrile groups into carboxyl groups and reaction of the dicarboxylic acid formed with diamines during polycondensation, or
3. The preparation of polyethers with terminal amino groups as described for example in German Offenlegungsschrift No. 1,595,274 published May 6, 1970. These α-w-diamino polyethers can also permanently be incorporated into polyamides by reaction with dicarboxylic acids so that the anti-statically active polyethylene oxide segments cannot be washed out.

The crosslinked or pre-crosslinked high molecular weight polyalkylene oxides used in accordance with the invention do not require these reactions because, although they will swell in water and organic solvents such as, aliphatic alcohols, ketones and halogenated hydrocarbons, they are substantially insoluble therein and, for this reason, cannot be washed out of polyamide filaments or fibres.

Accordingly, the present invention relates to novel, permanently anti-static, polyamide compositions comprising an aliphatic polyamide and from 0.5 to 40% preferably 0.5 to 20% by weight, based on the polyamide composition, of a polyalkylene oxide obtained by the copolymerisation of mono-epoxides with di- or tri-epoxides.

The permanently anti-static polyamide compositions are prepared by adding either to the polyamides during or after polycondensation or to the polyamide-forming starting materials before polycondensation a polyalkylene oxide obtained by the copolymerisation of mono-epoxides with di- or tri-epoxides in such a quantity that the polyamide composition contains from 0.5 to 40%, preferably 0.5 to 20% by weight of the polyalkylene oxide.

The polyalkylene oxides used in accordance with the invention are prepared by polymerising ethylene oxide and/or other cyclic oxides with three or more ring members with basic catalysts in the presence of di- or tri-epoxides. The addition of these di- or tri-epoxides result in the formation of a polyalkylene oxides which is heavily branched or slightly crosslinked depending upon the type and quantity of the additives. Polymers of this kind can be obtained for example, in accordance with German Offenlegungsschrift No. 2,032,430 published Jan. 14, 1971. The diepoxide is selected from the group consisting of butadiene dioxide, pentadiene dioxide, hexadiene dioxide, dodecatriene dioxide, dicyclobutadiene dioxide, dicyclopentadiene dioxide, dicyclohexadiene dioxide, vinyl cyclobutene dioxide, vinyl cyclopentene dioxide, vinyl cyclohexene dioxide, butenecyclobutene dioxide, butenecyclopentene dioxide, butadienecyclobutadiene dioxide, butadienecyclopentadiene dioxide and pentadienecyclobutadiene dioxide. The degree of crosslinking determines the solubility of the polyalkylene oxide so that it is readily possible to obtain a product which is suitable for use as a polyamide additive, which can no longer be washed out of the polyamide filaments or fibres and which imparts a permanent anti-static effect to fibres or filaments produced in accordance with the invention.

The crosslinked polyalkylene oxide produced in this way consists predominantly of ethylene oxide units. Where other alkylene oxides are used as well, up to 25 mol % of structural units corresponding to the formula:

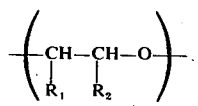

in which $R_1$ and $R_2$ represent hydrocarbon radicals and/or hydrogen atoms, can be present.

Examples of epoxides such as these used in conjunction include 1,2-propylene oxide, 1,2-butylene oxide, 2,3-butylene oxide and 2-phenyl-1,2-ethylene oxide. The required degree of crosslinking is adjusted by the further joint use of di- or poly-epoxides such as, for example,

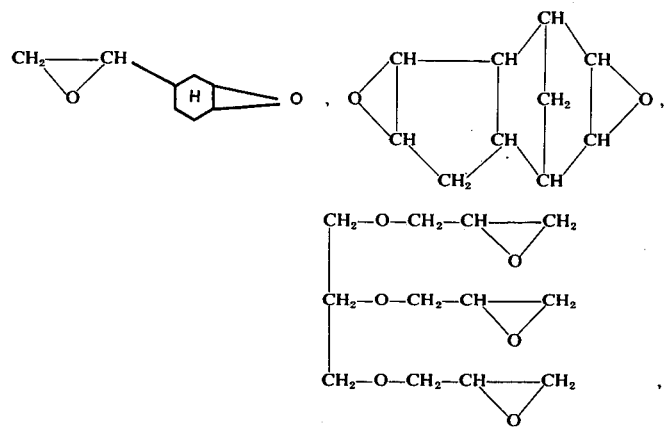

According to the invention, it is thus possible to process polyamides obtained by the polycondensation of aliphatic dicarboxylic acids with aliphatic diamines or by the polymerisation of lactams, into permanently anti-static polyamide compositions comprising from 0.5 to 40%, preferably 0.5 to 20% by weight, based on the polyamide composition, of a polyalkylene oxide obtained by the copolymerisation of a mono-epoxide with a di- or tri-epoxide. Polyamide-6 and polyamide-66 are particularly suitable.

Accordingly in one preferred embodiment,
a. 60 to 99.5% by weight of a stoichiometric mixture of a dicarboxylic acid corresponding to the general formula:

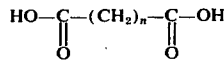

wherein $n$ is an integer from 4 to 10, and aliphatic diamines, preferably hexamethylene diamine, or of the corresponding salt of the general formula

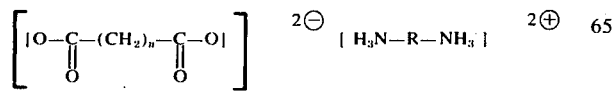

in which $n$ is an integer from 4 to 10, and R represents an aliphatic or cycloaliphatic radical or a radical of the formula

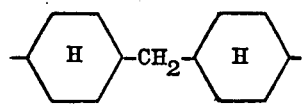

or b. a stoichiometric mixture of 59 to 89% by weight of ε-caprolactam and 1 to 10.5% by weight of -amino caproic acid, are polycondensed in the presence of
c. 40 to 0.5% by weight of a crosslinked or slightly crosslinked, high molecular weight polyalkylene oxide obtained by ionic polymerisation of, preferably, ethylene oxide with optionally up to 25 mol % of other three-membered cyclic aliphatic oxides in the presence of di- or tri-epoxides, in the melt at temperatures of from 100 to 270°C. under pressures of from 10 atmospheres to 0.001 Torr, the reaction being carried out in the absence of oxygen in an inert gas atmosphere. Polyamides thus obtained containing relatively high proportions of polyalkylene oxides, i.e. preferably containing 30 to 40% by weight of polyalkylene oxides can be used in the form of a concentrate in another preferred embodiment of the process according to the invention.

To prepare a concentrate of this kind, a mixture of from 30 to 40% by weight of the crosslinked or slightly crosslinked polyethylene oxide optionally modified with up to 25 mol % of other epoxides, with 70 to 60% by weight of the monomeric polyamide former, for example ε-caprolactam, ε-amino caproic acid or hexamethylene diammonium adipate, is heated without stirring to a temperature of from 100° to 270°C either under normal pressure or under elevated pressure over a period of from 0.5 to 6 hours in the presence of an inert gas such as nitrogen, hydrogen or helium. Condensation is then continued with thorough stirring for from 3 to 30 hours at 200 to 270°C either under normal or elevated pressure. Thereafter the pressure can be reduced, generally to below 15 Torr and preferably to below 1 Torr. Under these conditions, polycondensation is carried out, if necessary, for 15 minutes to 10 hours until the required melt viscosity is reached and the polyalkylene oxide is uniformly dispersed in the polyamide.

On completion of the polycondensation, the resulting concentrate of polyalkylene oxide in the polyamide can be directly admixed from the melt through a metering screw with pure polyamide-6 or polyamide-66, for example, before the spinneret in the quantitative ratio sufficient for adjusting an adequate anti-static effect. Another possibility is to extrude the concentrate and to granulate the resulting strands, re-melt the granulate and then add it to the normal polyamide melt in measured amounts. Conventional stabilisers of the kind which contribute towards stabilisation in radical processes such as, for example, sterically hindered phenols, can be added to the reaction mixture during all the process stages involved in production or measured addition of the concentrate. In this way, it is possible to prevent the polyalkylene oxide used from being damaged and discoloured at elevated temperatures.

The relative solution viscosities $\eta_{rel}$ quoted in the following Examples were measured at 25°C on solutions of 1 g of substance in 100 ml of m-cresol.

EXAMPLE 1

(Preparation of a concentrate)

A mixture of 20 kg of crosslinked or slightly crosslinked high molecular weight polyethylene oxide respectively, 43 kg of ε-caprolactam and 4.25 kg of ε-amino caproic acid is introduced into an externally heated 150-liter-capacity fine steel (V2A) autoclave equipped with a stirring machanism, a gas-inlet pipe and a spinning attachment, while a stream of oxygen-free nitrogen is passed over; the mixture is heated without stirring to a temperature of 260°C under normal pressure. After this temperature has been reached, the stirrer is switched on and the mixture is stirred under nitrogen for 5 hours at 260° to 262°C/normal pressure. Thereafter an excess pressure of 5 to 6 atmospheres of nitrogen is applied in the autoclave and polycondensation is continued under these conditions for 16 hours at 260°C. After the autoclave has been vented to normal pressure, the homogeneous polycondensate is continuously spun off via an extruder through a multiple-hole spinneret on to a steel belt cooled from beneath. This steel belt carries the cooled filaments into a granulator. The resulting granulate has a relative solution viscosity $\eta_{rel}$ of 2.15.

The polyethylene oxide used was prepared as follows:

The catalyst required for polymerising the ethylene oxide is initially synthesised under anhydrous conditions in a nitrogen atmosphere. To this end, 408 parts by weight of liquid anhydrous ammonia and 80 parts by weight of anhydrous n-hexane are introduced at −50°C into a reactor vessel with a cooling jacket. 40 parts by weight of pure calcium chips are introduced in portions into this mixture. After stirring for 15 minutes, 160 parts by weight of the diepoxide of 1-vinyl-3-cyclohexene in 70 parts by weight of benzene are added at −50°C and stirring is continued for 30 minutes at −40°C. The excess NH$_3$ is then evaporated off and the reaction mixture is slowly heated to room temperature and ultimately to 40°C. The residual ammonia is finally distilled off in vacuo. The 214 parts by weight of catalyst obtained are suspended in 214 parts by weight of n-hexane.

50 ml of this catalyst suspension are introduced together with 600 ml of cyclohexane, and liquid ethylene oxide is added dropwise in such a way that the reaction is controlled by its heat of evaporation and the internal temperature does not rise above 28° to 30°C. 1500 ml of liquid ethylene oxide are polymerised in this way. The branched or slightly crosslinked high molecular weight polyethylene oxide is precipitated during the reaction in the form of a white powder which can be directly used after filtration under suction and drying. The relative solution viscosity of a solution of 0.3 g of this product in 100 ml of m-cresol measured at 25°C, amounted to 4.77.

Similar products are obtained by copolymerising, in addition to ethylene oxide, up to 25 mol % of other epoxides such as 1,2-propylene oxide.

EXAMPLE 2

(Preparation of a concentrate)

As described in Example 1, the mixture of components is introduced into the apparatus described in that Example, condensed and the polycondensate isolated in the same way. The only difference is that the polyethylene oxide used in Example 1 is replaced by a polyethylene oxide prepared with a catalyst obtained by reacting 40 parts of calcium chips with 210 parts as opposed to 160 parts of the dipeoxide of 1-vinyl-3cyclohexene. Although the polyethylene oxide obtained and used in this way is able to swell in water and organic solvents, it is not possible to prepare a homogeneous solution therefrom. The polyamide granulate has a relative solution viscosity $\eta_{rel}$ of 1.9.

EXAMPLE 3

(Preparation of permanently anti-static polyamide filaments from concentrates)

The 30% concentrates of polyethylene oxide in polyamide 6 obtained in granulate form in accordance with Examples 1 and 2 are each fused and added to a pure polyamide-6 melt ($\eta_{rel}$ = 2.2) in such quantities that the filaments of 100 dtex spun after the two components had been thoroughly mixed in a double-shaft extruder contains increasing quantities of from 1 to 6% by weight of anti-statically active substance. In order to remove the spinning preparation, the material obtained is initially washed at 60°C in a washing machine containing 5 g/l of a detergent and then conditions for 48 hours at 23°C/50% relative humidity. The electrical surface reistance is measured with conventional high resistance meters. The washing and measuring cycle described is repeated in all 10 times. The results are set out in the following Tables, the concentrate of Example 1 being used in the tests according to Table 1 and the concentrate of Example 2 in the tests according to Table 2.

Table 1

| % of polyethylene oxide in PA-6 | electrical surface resistance (Ω) | | |
|---|---|---|---|
| | after 1 wash | after 5 washes | after 10 washes |
| 0 | $8.10^{12}$ | $1.10^{13}$ | $1.10^{13}$ |
| 1 | $6.10^{11}$ | $8.10^{11}$ | $8.10^{11}$ |
| 2 | $5.10^{11}$ | $4.10^{11}$ | $5.10^{11}$ |
| 3 | $3.10^{11}$ | $4.10^{11}$ | $6.10^{11}$ |
| 4 | $3.10^{11}$ | $3.10^{11}$ | $4.10^{11}$ |
| 5 | $3.10^{11}$ | $2.10^{11}$ | $2.10^{11}$ |
| 6 | $2.10^{11}$ | $3.10^{11}$ | $3.10^{11}$ |

| % of polyethylene oxide in PA-6 | electrical surface resistance (Ω) | | |
|---|---|---|---|
| | after 1 wash | after 5 washes | after 10 washes |
| 0 | $7.10^{12}$ | $1.10^{13}$ | $9.10^{12}$ |
| 1 | $3.10^{11}$ | $6.10^{11}$ | $8.10^{11}$ |
| 2 | $1.10^{11}$ | $1.10^{11}$ | $3.10^{11}$ |

Table 1-continued

| % of polyethylene oxide in PA-6 | electrical surface resistance (Ω) after 1 wash | after 5 washes | after 10 washes |
|---|---|---|---|
| 3 | $8.10^{10}$ | $8.10^{10}$ | $9.10^{10}$ |
| 4 | $8.10^{10}$ | $1.10^{11}$ | $1.10^{11}$ |
| 5 | $7.10^{10}$ | $8.10^{10}$ | $7.10^{10}$ |
| 6 | $5.10^{10}$ | $8.10^{10}$ | $7.10^{10}$ |

EXAMPLE 4

(Direct preparation of permanently anti-static polyamide filaments)

5% by weight of a polyethylene oxide prepared as described at the end of Example 1 are added to a polyamide-66 melt ($\eta_{rel} = 2.4$), the two components mixed until homogeneously distributed in a double-shaft extruder and the homogeneous mass is subsequently spun into a filament of 100 dtex. The spinning preparation was removed and the filament was found to have an electrical surface resistance of $1.10^{11}\Omega$. After 10 washes, this value had undergone a negligible decrease to $1.5 \times 10^{11}\Omega$. An equally thick polyamide-66 filament without the anti-statically active substance, measured for comparison, had an electrical surface resistance of $9.10^{12}\Omega$ after the first wash. After 10 washes, this value had fallen to $2.10^{13}\Omega$.

If for comparison this test is carried out with 5% by weight of a linear polyethylene oxide with a molecular weight of 1500 instead of the high molecular weight branched polyethylene oxide, the surface resistance amounts to $9.10^{12}$ ohms after 10 washes which corresponds substantially to the value of the control sample and is not adequate for anti-static protection.

We claim:

1. A permanently anti-static polyamide composition comprising an aliphatic polyamide and from 0.5 to 40% by weight based on the polyamide composition of a substantially water-insoluble high-molecular weight polyalkylene oxide dispersed in the polyamide and obtained by the copolymerization of a mono-epoxide with a di- or tri-epoxide.

2. The permanently anti-static polyamide composition as claimed in claim 1 comprising an aliphatic polyamide selected from the group consisting of polycaprolactam and polyhexamethylane adipamide and from 0.5 to 40% by weight based on the polyamide composition, of a polyalkylene oxide obtained by the copolymerisation of ethylene oxide with a di- or tri-epoxide.

3. The permanently anti-static polyamide composition as claimed in claim 2, wherein the polyalkylene oxide is obtained by the copolymerisation of ethylene oxide with a di- or tri-epoxide in the presence of up to 25% of epoxides selected from the group consisting of 1,2-propylene oxide, 1,2-butylene oxide, 2,3-butylene oxide and 2-phenyl-1,2-ethylene oxide.

4. Polyamide composition according to claim 1 wherein the diepoxide is selected from the group consisting of butadiene dioxide, pentadiene dioxide, hexadiene dioxide, dodecatriene dioxide, dicyclobutadiene dioxide, dicyclopentadiene dioxide, dicyclohexadiene dioxide, vinyl cyclobutene dioxide, vinyl cyclopentene dioxide, vinyl cyclohexene dioxide, butenecyclobutene dioxide, butenecyclopentene dioxide, butadienecyclobutadiene dioxide, butadienecyclopentadiene dioxide, pentadienecyclobutadiene dioxide,

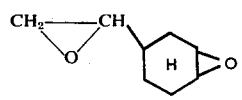

and

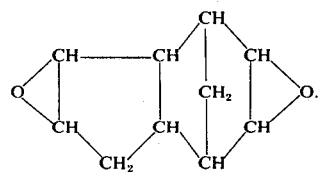

5. A permanently anti-static, polyamide composition comprising an aliphatic polyamide and from 30 to 40% by weight, based on the polyamide composition, of a polyalkylene oxide obtained by the copolymerisation of a mono-epoxide with a di- or tri-epoxide.

6. A process for the production of a permanently anti-static polyamide composition comprising the addition of a polyalkylene oxide obtained by the copolymerisation of a monoepoxide with di- or tri-epoxides to a polyamide during or after polycondensation or to polyamide-forming starting materials before polycondensation in such a quantity that the resulting polyamide composition contains from 0.5 to 40% by weight, based on the composition, of the polyalkylene oxide.

* * * * *